US006243634B1

(12) United States Patent
Oestreicher et al.

(10) Patent No.: US 6,243,634 B1
(45) Date of Patent: Jun. 5, 2001

(54) METHOD AND SYSTEM FOR DETERMINING WEIGHT AND POSITION OF A VEHICLE SEAT OCCUPANT

(75) Inventors: Ralf Oestreicher, Troy; Michelle Homann, Auburn Hills, both of MI (US); Harold Lichtinger, Köfering (DE); Scott Morell, Whitelake Twp.; Dan Reich, Clinton Twp., both of MI (US)

(73) Assignee: Siemens Automotive Corporation, Auburn Hills, MI (US)

( * ) Notice: Subject to any disclaimer, the term of this patent is extended or adjusted under 35 U.S.C. 154(b) by 0 days.

(21) Appl. No.: 09/548,485

(22) Filed: Apr. 13, 2000

Related U.S. Application Data

(63) Continuation of application No. 09/191,719, filed on Nov. 12, 1998, now Pat. No. 6,070,115.
(60) Provisional application No. 60/065,115, filed on Nov. 12, 1997.

(51) Int. Cl.$^7$ .................................................. B60R 21/32
(52) U.S. Cl. ............................................ 701/45; 280/735
(58) Field of Search ................................ 280/735; 701/45

(56) References Cited

U.S. PATENT DOCUMENTS

| | | |
|---|---|---|
| 2,708,005 | 5/1955 | Gazzo . |
| 3,022,976 | 2/1962 | Zia ................................. 297/216.18 |
| 3,766,344 | 10/1973 | Nevett . |
| 4,075,443 | 2/1978 | Fatur . |
| 5,071,160 * | 12/1991 | White et al. .......................... 280/735 |
| 5,232,243 * | 8/1993 | Blackburn et al. ................... 280/735 |
| 5,413,378 * | 5/1995 | Steffens, Jr. et al. ................ 280/735 |
| 5,474,327 | 12/1995 | Schousek ............................. 280/735 |
| 5,481,078 | 1/1996 | Asche . |
| 5,502,284 | 3/1996 | Meiller . |
| 5,542,493 | 8/1996 | Jacobson .............................. 180/272 |
| 5,570,903 | 11/1996 | Meister et al. ....................... 280/735 |
| 5,573,269 * | 11/1996 | Gentry et al. ......................... 280/735 |
| 5,605,348 | 2/1997 | Blackburn et al. ................... 280/735 |
| 5,612,876 | 3/1997 | Zeidler et al. ................. 364/424.055 |
| 5,618,056 | 4/1997 | Schoos et al. ....................... 280/735 |
| 5,678,854 | 10/1997 | Meister et al. ....................... 280/735 |
| 5,732,375 | 3/1998 | Cashler ................................. 701/45 |
| 5,739,757 | 4/1998 | Gioutsos ............................... 340/667 |
| 5,804,887 | 9/1998 | Holzapfel et al. .................. 307/10.1 |
| 5,810,392 | 9/1998 | Gagnon ............................... 280/735 |
| 5,971,432 | 10/1999 | Gagnon ............................... 280/735 |
| 6,039,344 | 3/2000 | Mehney ............................... 280/735 |

* cited by examiner

Primary Examiner—Kenneth R. Rice

(57) ABSTRACT

A method and system for determining weight and/or position of a vehicle seat occupant to be used for controlling the reaction of a safety restraint system. A plurality of spaced weight sensors are disposed between a seating surface and seat mounting surface to provide output signals indicative of an applied weight on each sensor. The sensors are spaced such that the sensors measure the weight applied to a seat back and the seating surface. A controller calculates the weight and/or position of the seat occupant in response to the output signals of the sensors. The controller sends the weight and position of the seat occupant to the safety restraint system to be used to tailor or suppress the reaction of the safety restraint system.

14 Claims, 8 Drawing Sheets

US 6,243,634 B1

METHOD AND SYSTEM FOR DETERMINING WEIGHT AND POSITION OF A VEHICLE SEAT OCCUPANT

FIELD OF THE INVENTION

This application claims the benefit of U.S. Provisional Application 60/065,115, filed on Nov. 12, 1997. This invention relates to vehicle safety restraint systems and more particularly to a method and system for controlling the reaction of safety restraint systems in response to weight and position of a vehicle occupant. This application is a continuation of U.S. patent application Ser. No. 09/191,719 filed on Nov. 12, 1998, now U.S. Pat. No. 6,070,115.

BACKGROUND OF THE INVENTION

It is known in the art relating to vehicle safety restraint systems to adjust the reaction of the restraint system to accommodate for the weight and position of the vehicle occupant. It is desirable to prevent injury and unnecessary deployment of the safety restraint system. Deployment of an air bag associated with an unoccupied seat location during a vehicle crash adds unnecessary expense to repair of the vehicle. Also, it is desirable to prevent deployment of the air bag when a small child, or an infant in a rear facing car seat, is occupying the seat.

To prevent such unnecessary deployment of an air bag at an unoccupied seat location, sensors are provided to detect the presence of an occupant on the vehicle seat. These sensors include pressure sensing switches located in the seat cushion or infrared or ultrasonic sensors located in the vehicle dashboard or instrument panel. A problem with the infrared or ultrasonic sensors is that if the dashboard is blocked or the seat is covered, accurate detection of a seat occupant in the seat is hindered. Also, such sensors are not cost effective. Furthermore, most prior sensing systems fail to provide an accurate weight of the seat occupant which can be used to determine and adjust the reaction of safety restraint systems.

Another device for controlling a safety restraint system is a manual override switch that may be installed to allow a driver to disable the passenger-side air bag manually. Such devices, however, become ineffective in instances where the driver or operator simply forgets to turn the switch on or off depending upon the existence of a passenger or a child in the vehicle seat.

SUMMARY OF THE INVENTION

The present invention provides a method and system for determining weight and/or position of a vehicle seat occupant to control the reaction of safety restraint systems, such as air bag modules and constant force retractors.

An object of the present invention is to provide a system that controls the reaction of the safety restraint system in response to the weight of the seat occupant and their position. For example, if the seat occupant is a child having a low weight, the air bag module will not be deployed.

Another object of the present invention is to modify the air bag deployment if the seat occupant is improperly seated or too close to the dashboard.

A further object of the present invention is to modify the inflation force of the air bag module in response to the weight of the seat occupant.

Another object of the present invention is to provide the seat occupant's seating position during pre-crash braking where the occupant's position changes rapidly due to high deceleration due to braking.

A still further object of the present invention is to provide a more accurate weight of the seat occupant.

The method of the present invention includes sampling output signals of a plurality of spaced weight sensors disposed between a seat surface and a seat mounting surface. The output signals of the weight sensors are added together to determine the total applied weight on a vehicle seat. The center of gravity is determined from the output signals of the weight sensors. An information factor is then determined. One of the information factors determined is a seating position of the occupant. The seating position of the seat occupant is determined from the center of gravity of the occupant. Another information factor determined is a correction factor. The correction factor is used to determine an actual weight of the seat occupant. The correction factor is multiplied by the total applied weight to determine the actual weight of the seat occupant. From the weight and position of the seat occupant, the seat occupant is classified into weight and position classifications. The classifications are then sent to the safety restraint system to be used to control the reaction of the safety restraint system.

The system of the present invention includes a plurality of weight sensors disposed between a seat surface and a seat mounting surface for providing output signals indicative of an applied weight on the sensors. The sensors are spaced such that the sensors measure the applied weight on the seat back and the seating surface. Each of the sensors includes a seat surface engaging portion, a seat mounting engaging portion and a walled portion extending between the engaging portions. Each walled portion includes at least one strain gage mounted thereon for measuring wall deflection which is proportional to applied weight. A controller is in communication with the weight sensors for calculating at least one information factor such as weight or position of the seat occupant. The weight and/or position information is sent to the safety restraint system to be used to control the reaction of the safety restraint system.

These and other features and advantages of the invention will be more fully understood from the following detailed description of the invention taken together with the accompanying drawings.

DETAILED DESCRIPTION OF THE INVENTION

Figure 1:
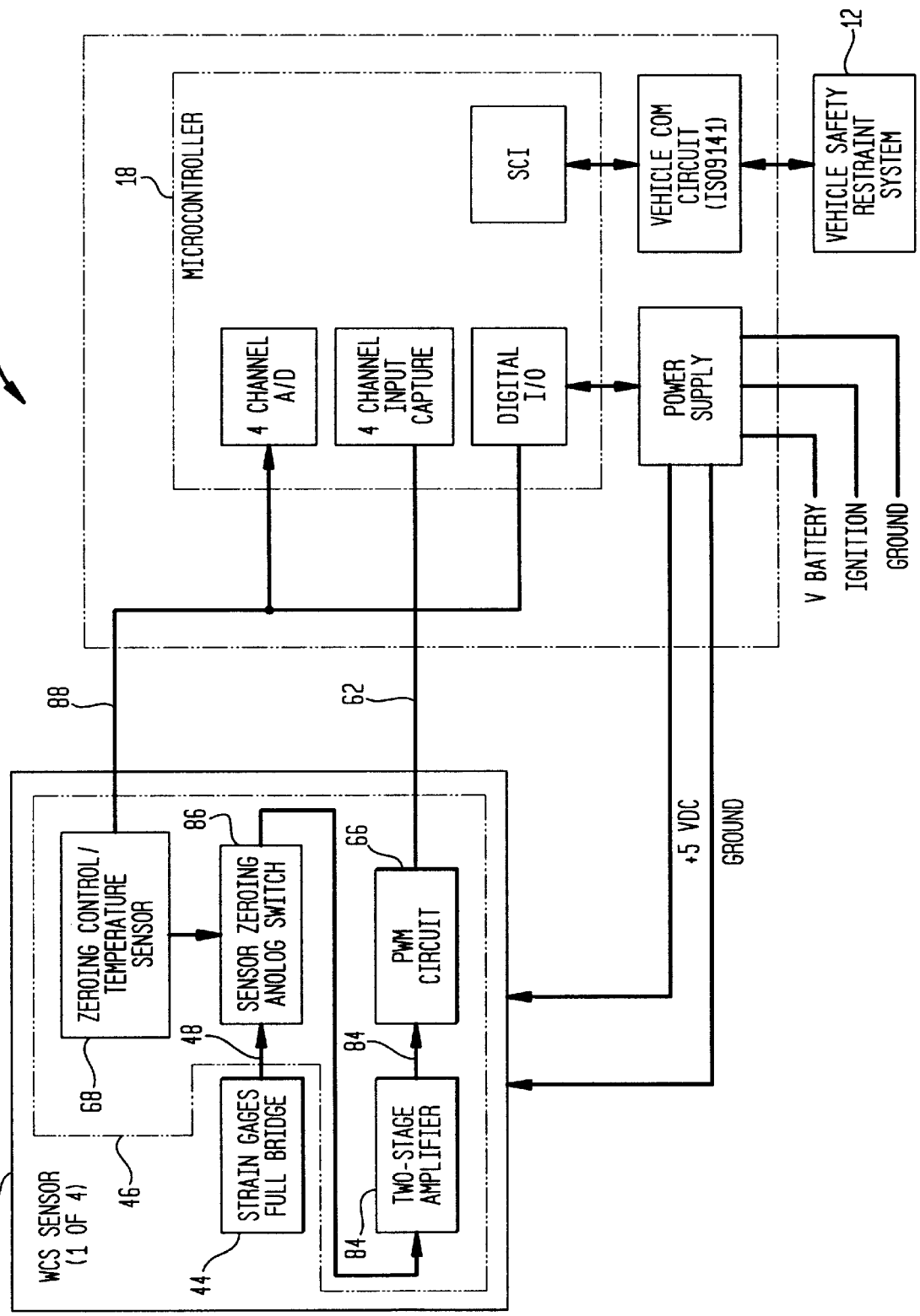
FIG. 1 is a block diagram of a system for determining the weight and position of a vehicle seat occupant in accordance to the present invention.

Referring now to the drawings, numeral 10 generally indicates a system for determining the weight and/or position of a vehicle occupant to control the reaction of a vehicle safety restraint system 12. The system 10 includes weight sensors 14 located beneath a vehicle seat 16 and a controller 18 to determine the weight and position of the vehicle occupant in response to the output signals of the weight sensors. For adaptive restraint systems, the weight and position of the seat occupant is an important parameter to adjust the reaction of safety devices such as air bags and constant force retractors in a crash situation.

The weight and position of the seat occupant can be determined by measuring the force or weight applied by the occupant to a seating surface, or seat pan 20, and to a seat back 22. A plurality of weight sensors 14 located between the seat and a designated seat mounting portion, for example, underneath the seat pan 20, are used to measure the forces applied to the seat 16. In one embodiment, the sensors 14 are disposed between the seat pan 20 and a seat mounting surface, or seat tracks 24. Alternatively, the weight sensors 14 may be disposed between the seat tracks 24 and a seat frame 26. The spacing of the sensors 14 is such that all forces applied to the seat back 22 and the seat pan 20 are measured.

Figure 2:
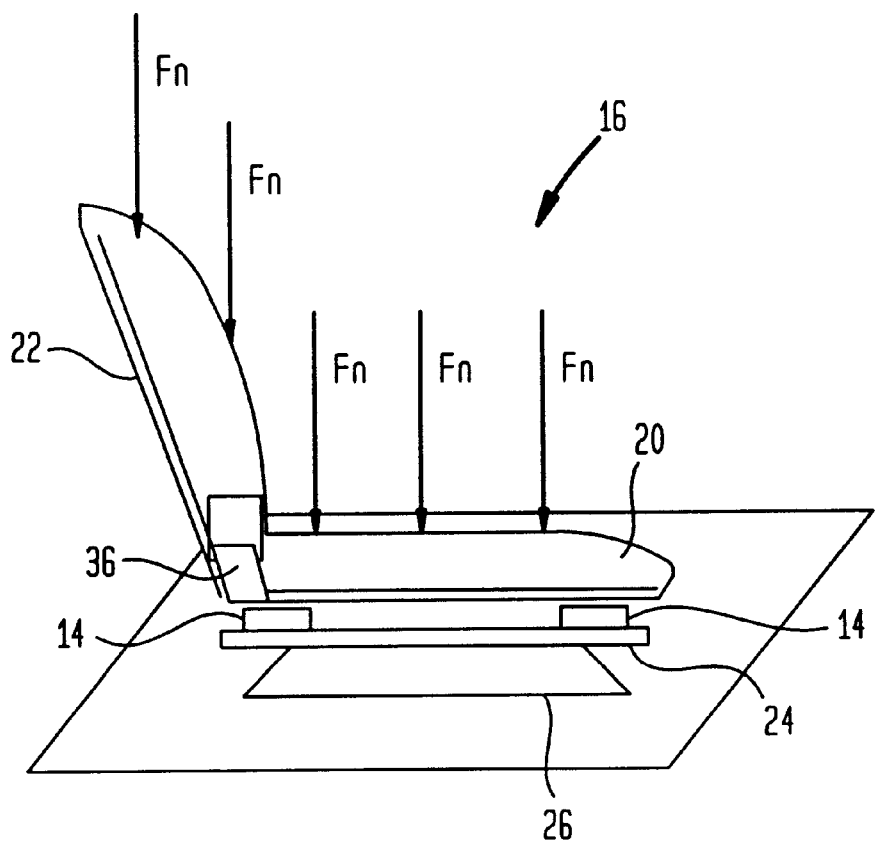
FIG. 2 is a side view of a vehicle seat having weight sensors disposed between a seating surface and seat mounting surface.
Figure 3:
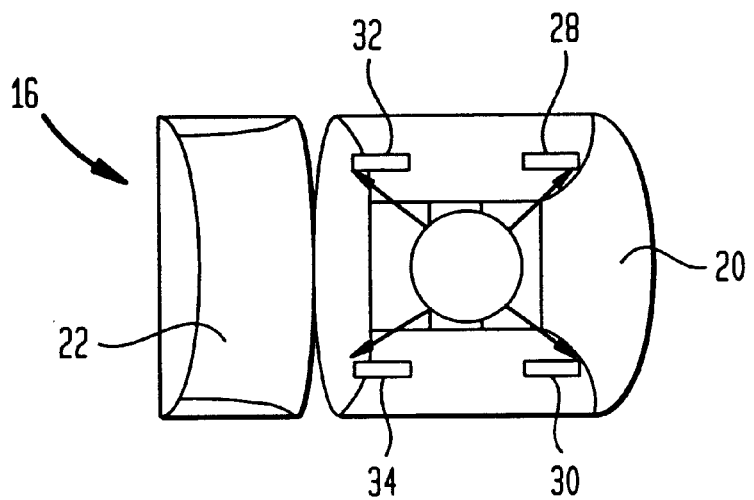
FIG. 3 is a schematic plan view of the vehicle seat having four sensors spaced according to one embodiment of the present invention.

In a preferred embodiment, the weight sensors 14 are located at the main connecting points of the seat pan 20 and the seat back 22 to the seat tracks 24. Referring to FIGS. 2 and 3, sensors 28,30 are located at a first connection point near the front of the seat 16 where the seat pan 20 and seat tracks 24 connect. Sensors 32,34 are located at a second connection point near the rear of the seat 16 where the seat pan 20, seat back brackets 36 and seat tracks 24 connect. Essentially, a sensor 14 is located near each corner of the seat pan 20. Such a mounting arrangement of sensors 28,30,32,34 allows for all seat pan 20 and seat back 22 forces ($F_n$) to be transferred through the sensors to the controller 18.

Figure 4:
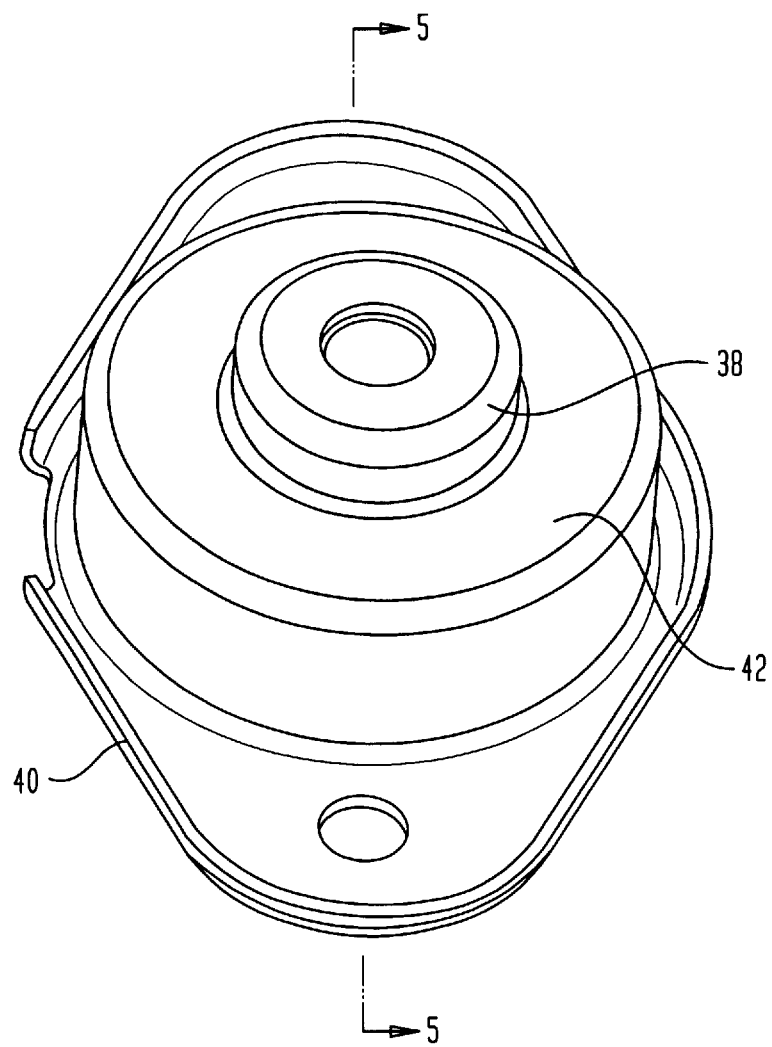
FIG. 4 is a perspective view of a weight sensor.
Figure 5:
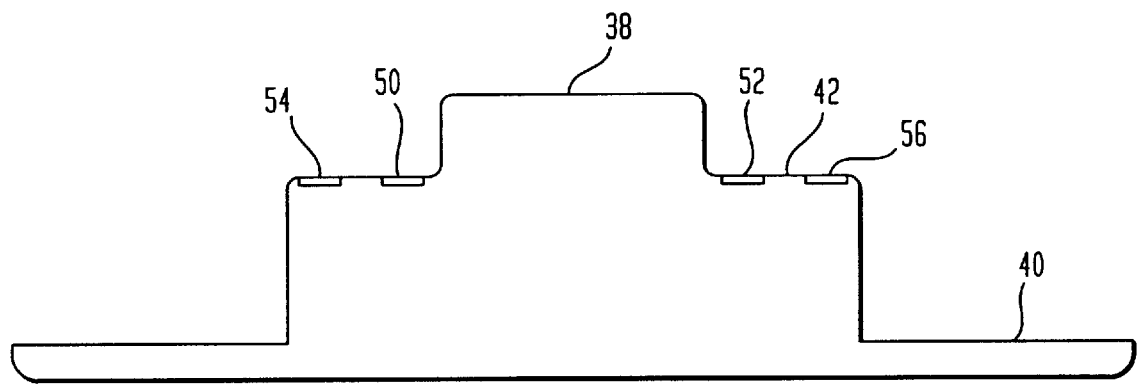
FIG. 5 is a cross-sectional view of the weight sensor taken along line 5—5 in FIG. 4.

Referring to FIGS. 4 and 5, each sensor 14 includes a seat surface engaging portion 38, a seat mounting surface engaging portion 40 and a walled portion 42 extending between the engaging portions 38,40. As shown in FIG. 1, each sensor 14 includes at least one strain gage 44 mounted thereon. When a force is applied to the sensor 14 the walled portion 42 deflects and the resulting wall deflection is proportional to the applied weight. Also, the walled portion 42 may include a sensor interface circuit 46 which allows the controller 18 to analyze a strain gage output signal 48 to calculate the weight and position of the seat occupant.

For a high sensitivity in the vertical axis and a low cross sensitivity against horizontal forces, four strain gages 50,52, 54,56 should be applied to the walled portion 42. Strain gages 50 and 52 are located on an inner diameter of the walled portion 42. Strain gages 54, 56 are located on an outer diameter of the walled portion 42. The strain gages 50,52 are diametrically opposite from each other and strain gages 54,56 are diametrically opposite from each other. For applications where the sensitivity and accuracy of the sensor can be decreased, only one or two strain gages may be used.

Each sensor 14 may include a full bridge or wheatstone bridge arrangement of strain gages that converts strain of the walled portion 42 to which it is attached into resistance changes. To obtain the strain gage output signal 48, a dc voltage is applied across two of the four terminals of the bridge. The difference between the output voltages at the other two terminals is the differential output voltage signal of the strain gage 44 which is proportional to the applied weight.

Figure 6:
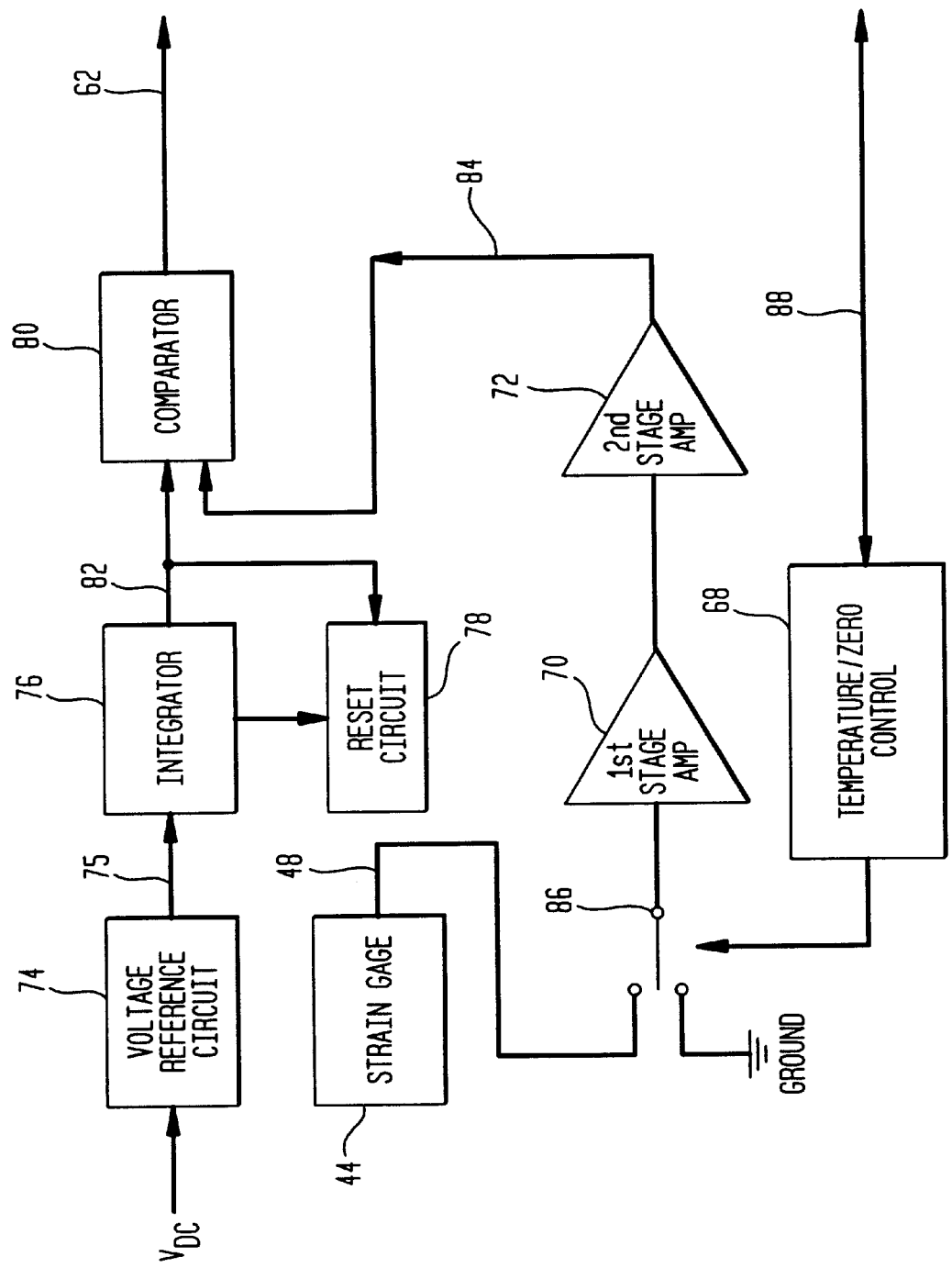
FIG. 6 is a block diagram of a sensor interface circuit for providing a signal indicative of the applied weight to the vehicle seat.

Referring to FIGS. 1 and 6, each sensor 14 may include the sensor interface circuit 46 which develops a pulse width modulation (PWM) signal 62 indicative of the applied weight to the sensor 14 that is applied to the controller 18. The circuit 46 includes a two-stage signal amplifier 84, pulse width modulation circuit 66, and temperature sensor/zeroing control circuit 68. Since the strain gage output signal 48 is at such a small voltage level, the two-stage signal amplifier 84 is needed to amplify the signal to a readable level. The two-stage amplifier 84 includes two operational amplifiers 70,72.

The pulse width modulation circuit 66 includes a voltage reference circuit 74, analog integrator 76 with reset circuit 78 and comparator 80. The voltage reference circuit 74 provides a constant voltage 75 to the analog integrator 76. The constant voltage 75 is generated from a supply voltage ($V_{dc}$). The voltage reference circuit 74 may be a voltage divider. The constant voltage 75 is applied to the integrator 76 to generate a reference signal 82 to be compared with an amplified strain gage output signal 84.

Figure 7A:
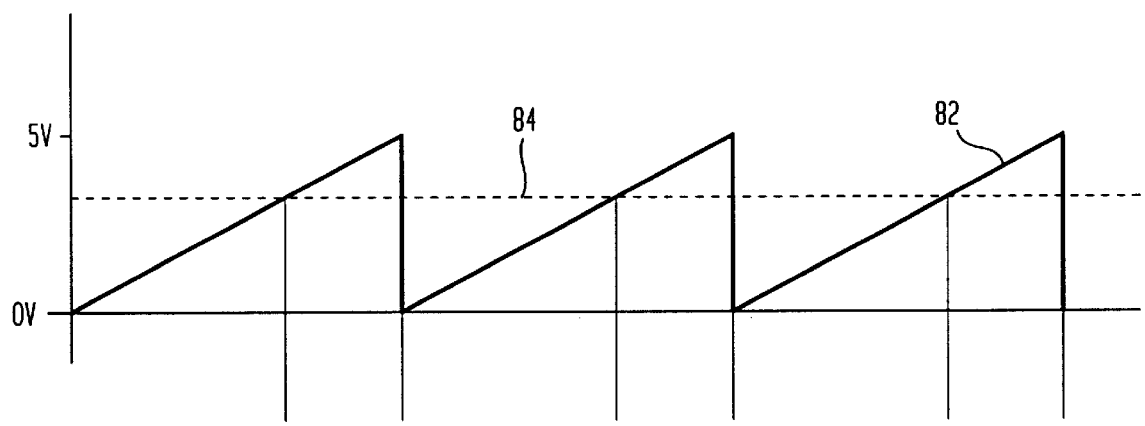
FIG. 7a is a graph of a reference signal from an integrator within the sensor interface circuit and of a strain gage output signal.

Referring to FIGS. 6 and 7a, the voltage reference circuit 74, integrator 76 and reset circuit 78 are used to produce a saw-tooth shaped signal, or the reference signal 82, at the output of the integrator 76 to be compared with the amplified strain gage output signal 84. The reset circuit 78 may include a comparator with hysteresis that controls a switch, such as a metal-oxide semiconductor field-effect transistor (MOSFET) transistor (not shown). The reset circuit 78 is connected between the output of the integrator 76 and a capacitor (not shown) within the integrator 76. When the output signal 82 of the integrator 76 reaches a predetermined voltage level, the reset circuit 78 changes state, causing the capacitor to stop charging and begin to discharge. By charging and discharging the capacitor, the output signal 82 of the integrator 76 ramps from a low to a high voltage, producing the "saw-tooth" signal, as shown in FIG. 7a.

Figure 7B:
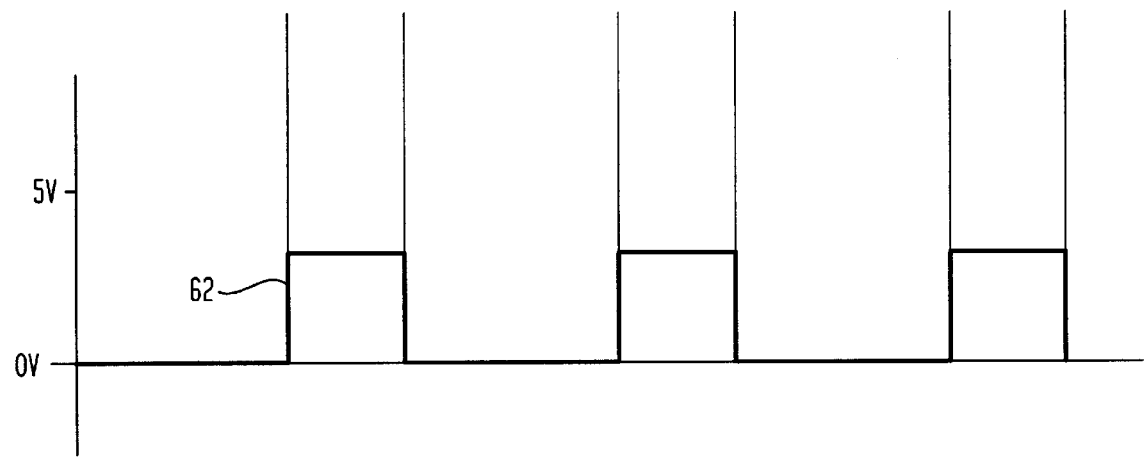
FIG. 7b is a graph of a pulse width modulation signal from the sensor interface circuit indicative of the applied weight on the seat.

The reference signal 82 and the amplified strain gage output signal 84 are applied to the comparator 80 to produce the PWM signal 62 indicative of the applied weight to the sensor. Referring to FIGS. 7a and 7b, when the voltage output of the strain gage 44 is lower than the voltage output of the integrator 76, the comparator 80 generates a logic high output. Further, when the voltage output of the strain gage 44 is higher than the voltage of the output of the integrator 76, the comparator 80 generates a logic low output. The time between pulses is proportional to the weight applied to the sensor.

To correct voltage offsets due to varying temperature in the sensor interface circuit 46, the temperature/zero control circuit 68 is included in the circuit 46. The control circuit 68 includes a temperature sensor and sensor zeroing analog switch 86. The output signal 88 of the temperature/zero control circuit 68 is applied to the controller 18 as an analog signal. Also, multiplexed on the same output signal 88 is ability of the controller to pull the temperature sensor output signal to +5V. This causes the sensor zeroing analog switch 86 to close, removing the strain gage output signal 48 from the amplifier 64 so that the PWM signal 62 can be measured when the strain gage output signal 48 of the strain gage is zero. By having the ability to measure the PWM signal 62 at zero output, the voltage offsets can be compensated in the controller 18.

From the PWM signal 62, the controller 18 can determine the weight of the seat occupant. Alternatively, the controller 18 can determine the center of gravity of the occupant and, then, from the center of gravity, the weight of the occupant. The center of gravity is centered somewhere within the confines of the sensor grouping. The center of gravity is determined by summing the forces applied to the sensors 28,30 near the front of the seat pan 20 and then dividing the sum by the total of all the forces applied to the sensors 28,30,32,34. In practice, it is found that the center of weight varies depending on the occupant and their seating position.

Figure 8:
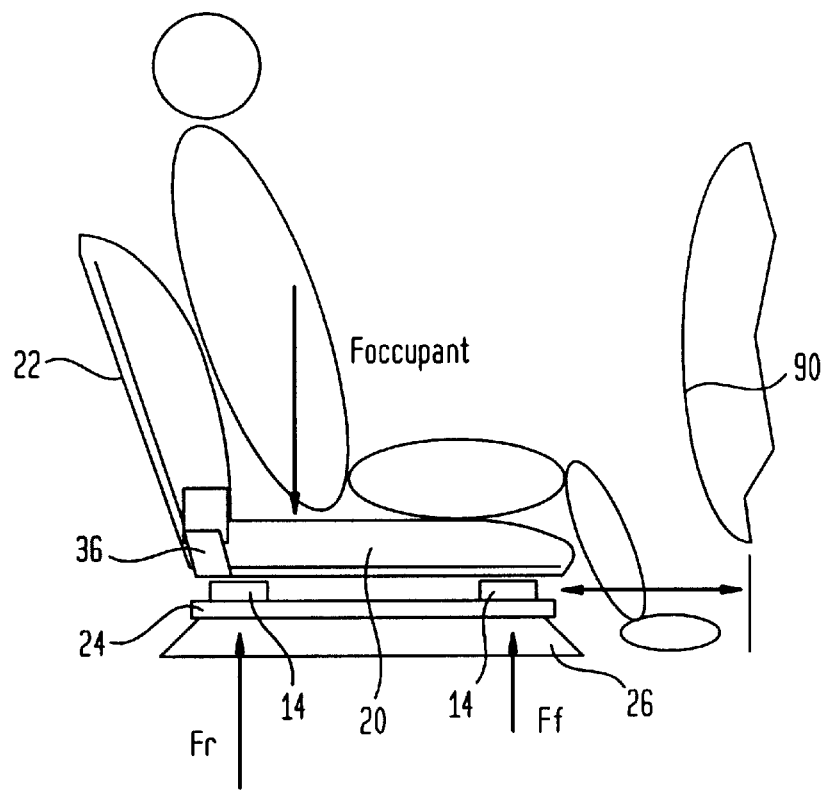
FIG. 8 is a schematic view of a seat occupant seated in a normal seating position illustrating the relationship between the occupant's distance from the dashboard and the forces applied to the seat.
Figure 9:
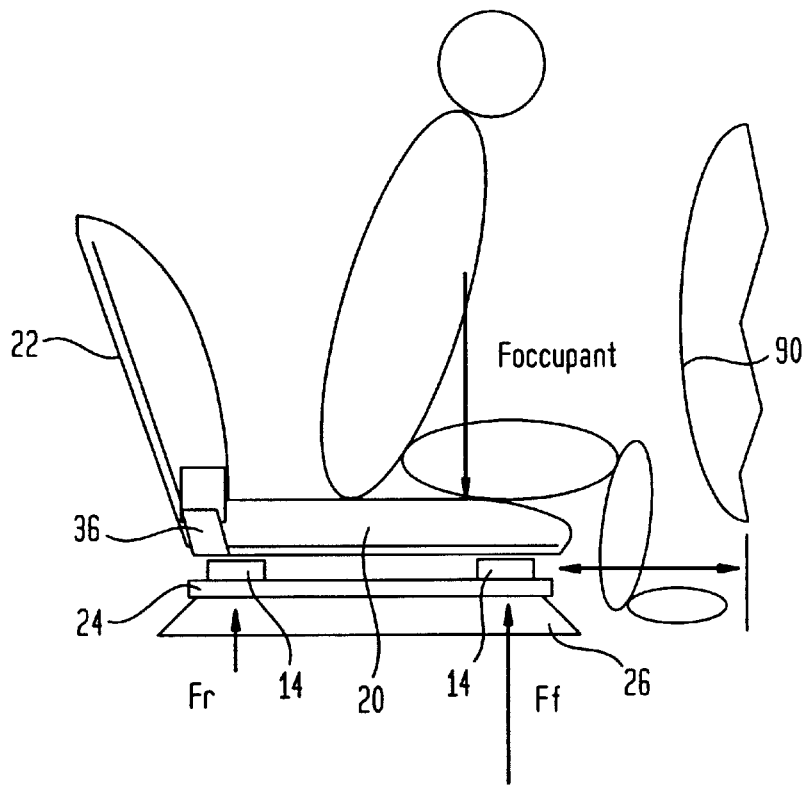
FIG. 9 is a schematic view of a seat occupant seated in a forward seating position illustrating the relationship between the occupant's distance from the dashboard and the forces applied to the seat.

In FIG. 8, the seat occupant is seated in a normal seating position and in FIG. 9, the occupant is seated in a forward seating position. It is apparent by comparing FIGS. 8 and 9 that the center of gravity of the occupant seating in the forward position is much closer to the dashboard 90 than the center of gravity of occupant seating in the normal position. Furthermore, FIGS. 8 and 9 show the relationship of the seat forces for normal and forward occupant seating positions.

The measured forces are directly related to the occupant's position in the seat. The occupant's force on the seat with position is indicated as the force vector, $F_{occupant}$. The occupant's center of gravity is the position of $F_{occupant}$ in the seat. The measured forces at the front and rear respectively are $F_f$ and $F_r$. For the normal seating position, the force at the rear, $F_r$ is higher than the front, $F_f$. This is due to more of the occupant's weight located in the upper body. With a high percentage of the occupant's weight in the upper body, the center of gravity is a good indication of the distance of the occupant's upper body to the dashboard 90. Alternatively, a position sensor may be mounted within the seat tracks to determine the distance between the seat and the dashboard 90. By combining the seat position and the seating position of the seat occupant, a position classification can be determined indicative of the occupant's position relative to the dashboard.

For the forward seating position, the occupant's upper body is leaning forward, causing the center of gravity to shift forward as indicated. Thus, the measured force at the front, $F_f$ is now larger than at the rear, $F_r$. The change in the position of the upper body has a significant effect on the center of gravity. This center of gravity shift forward properly indicates a forward seated occupant, close to the dashboard 90. Thus, from the center of gravity, an accurate weight and position of the occupant can be determined.

From the center of gravity, a correction factor is calculated. The correction factor is used to determine the actual weight of the seat occupant. The correction factor is a correlation between the center of gravity and the seating position of the occupant. The correction factor may be determined by, for example, but not limited to, using appropriate correction factor algorithms or look up tables. The correction factor is needed because the measured forces are proportional to the weight applied to the seat, but not directly related to the weight of the occupant.

In most seating positions only a variable part of the occupant's weight is applied to the seat. The percentage of weight seen on the seat is influenced by the position of the occupant. For example, in a standard seating position about 85% of the passenger's weight is seen on the seat. The rest is mainly applied to the floor of the car through the legs. A passenger leaning forward applies more weight to the floor than a passenger in a reclined position. Thus, use of the correction factor increases the accuracy of the measured weight.

Figure 10:
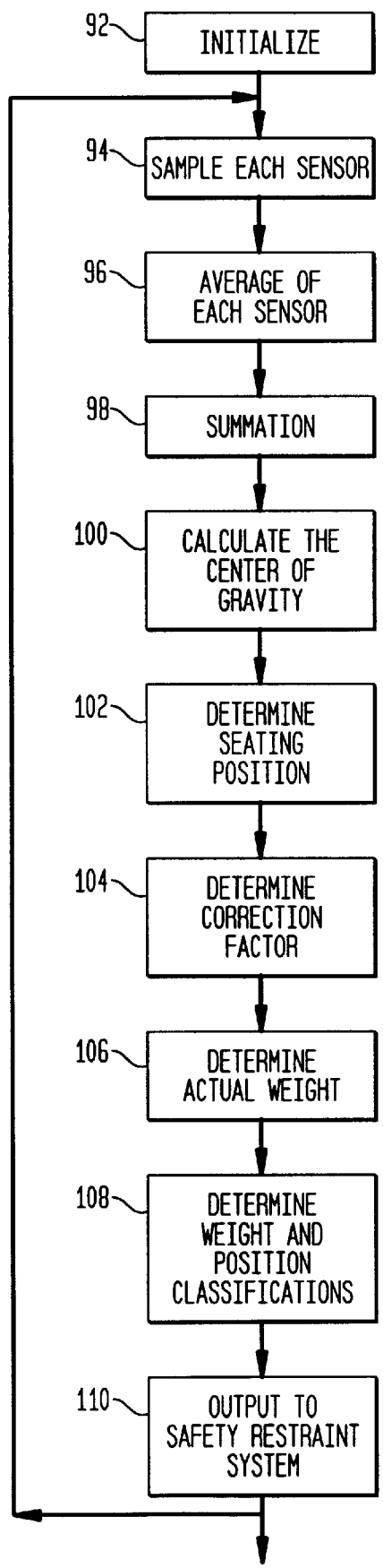
FIG. 10 is a flow diagram of the operation of the system.
Figure 11:
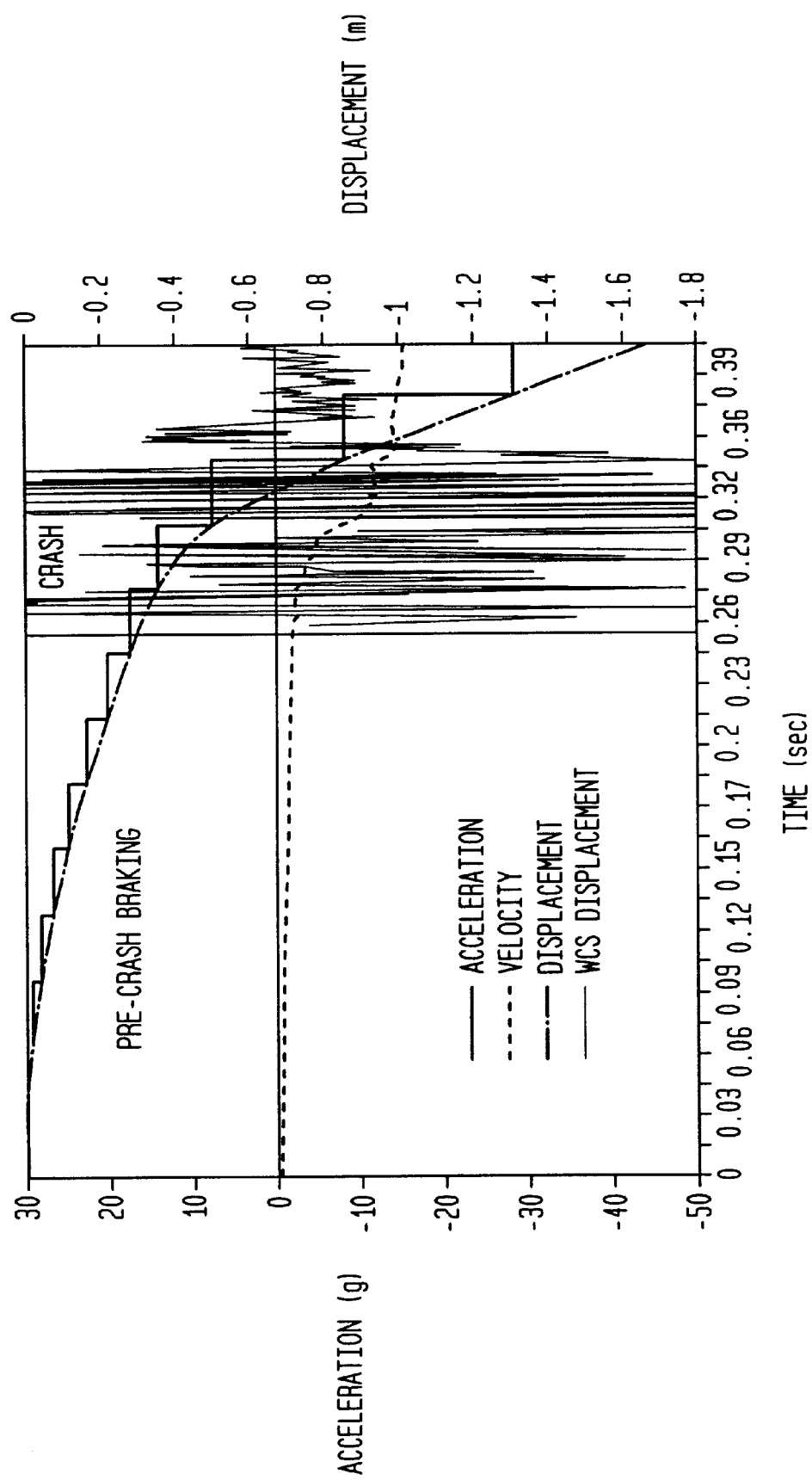
FIG. 11 is a graph of vehicle acceleration vs. time illustrating the seat occupant's position displacement during pre-braking and crash.

The controller 18 calculates the weight and/or position of the occupant by sampling the response of each sensor to applied weight to the seat. FIG. 10 is a flow diagram of the operation of the weight and position system. The algorithm is initialized in step 92 and each sensor is sampled in step 94. The controller 18 samples the sensors 14 about every 30 milliseconds. Because of such a fast sample rate, the position of the seat occupant can be measured during pre-crash braking, as shown in FIG. 11. A biased average of each sensor output signal is taken over time in step 96, allowing for a better understanding of the occupant's weight. The averages are summed together to obtain a total force or weight parameter in step 98. Then, the center of gravity is calculated in step 100. The seating position of the seat occupant is determined from the center of gravity in step 102. Also, the correction factor is determined from the center of gravity in step 104. After the correction factor is determined, an actual weight of the occupant is found by multiplying the applied weight by the correction factor in step 106. From the weight and position of the occupant, the controller determines the weight and position classifications in step 108. The controller sends the classification information to the safety restraint system to be used to control the reaction of the safety restraint system in step 110.

Alternatively, the center of gravity is not needed to determine the weight of the occupant. If the measured weight is below a predetermined value, the occupant is considered a child, then the measured weight is the real weight. However, if the measured weight is above a predetermined value, the measured weight is multiplied by a particular correction factor for a normal seating position to obtain the real weight of the occupant. Then, the weight classification is determined and the classification to the safety restraint system.

Although the invention has been described by reference to a specific embodiment, it should be understood that numerous changes may be made within the spirit and scope of the inventive concepts described. Accordingly, it is intended that the invention not be limited to the described embodiment, but that it includes all modifications encompassed within the spirit the following claims.

What is claimed is:

1. A weight sensing apparatus for a vehicle seat comprising:

a plurality of sensors each including a mounting portion for attachment to a vehicle seat structure and a deflectable portion that deflects in response to a weight force applied to the vehicle seat structure wherein at least one of said sensors is mounted forwardly on the seat structure to generate a front seat weight signal in response to said weight force and at least one of said sensors is mounted rearwardly on the seat structure to generate a rear seat weight signal in response to said weight force; and a controller for comparing said front seat weight signal to said rear seat weight signal to determine occupant center of gravity and combining said front and rear seat weight signals to determine seat occupant weight.

2. An apparatus as in claim 1 including at least one strain gage mounted to said deflectable portion of each of said sensors.

3. An apparatus as in claim 2 wherein the combination of said front and rear weight signals are proportional to said weight force applied to the seat structure and wherein the apparatus includes correction factor data accessible by said processor to adjust said weight signals based on said center of gravity to generate a final weight signal representative of the actual weight of the occupant.

4. An apparatus as in claim 2 wherein said seat structure is a seat pan having a rectangular shape to define four corners and wherein said plurality of sensors is comprised of four sensors with one of said sensors mounted at each of said corners.

5. An apparatus as in claim 1 including a safety restraint device controlled by said controller in response to seat occupant weight.

6. An apparatus as in claim 5 wherein said safety restraint device is not deployed if seat occupant weight is below a predetermined weight.

7. A method for determining seat occupant weight including the steps of:

mounting at least one sensor on a forward portion of a vehicle seat structure;

mounting at least one sensor on a rearward portion of the seat structure wherein each sensor includes a deflectable portion that deflects in response to a weight force applied to the vehicle seat structure;

generating a forward weight signal in response to forward seat deflection generating a rearward weight signal in response to rearward seat deflection;

comparing the forward weight signal to the rearward weight signal to determine an occupant center of gravity and occupant position;

combining the forward and rearward weight signals to determine seat occupant weight; and controlling a safety restraint device based on the seat occupant weight and occupant position.

8. A method as in claim 7 further comprising the step of preventing deployment of the safety restraint device if the seat occupant weight is below a predetermined weight or the occupant position is within a predetermined distance from the safety restraint device.

9. A method as in claim 8 further comprising the step of mounting a strain gage to the deflectable portion of each sensor.

10. A method as in claim 9 wherein the seat structure is a seat pan and the method further comprises the step of mounting the sensors between the seat pan and a seat track assembly.

11. A method as in claim 7 further comprising the step of generating a correction factor based on the center of gravity to adjust the measured seat occupant weight.

12. A weight sensing apparatus for a vehicle seat comprising:

a first pair of sensors mounted to a forward portion of a seat pan;

a second pair of sensors mounted to a rearward portion of said seat pan wherein each sensor includes a mounting portion for attachment to said seat pan, a support portion for attachment to a seat track member, and a deflectable portion positioned between said mounting portion and said support portion that deflects in response to a weight force applied to said seat pan such that said first pair of sensors generates a forward weight signal and said second pair of sensors generates a rearward weight signal;

a controller for comparing said front weight signal to said rear weight signal to determine occupant center of gravity and combining said front and rear seat weight signals to determine seat occupant weight; and a safety restraint device controlled by said controller in response to seat occupant weight and center of gravity.

13. An apparatus as in claim 12 wherein the combination of said forward and rearward weight signals are proportional to said weight force applied to said seat pan and wherein the apparatus includes correction factor data accessible by said processor to adjust said weight signals based on said center of gravity to generate a final weight signal representative of the actual weight of the occupant.

14. An apparatus as in claim 13 wherein each of said sensors includes a plurality of strain gages mounted to said deflectable portion.

* * * * *